US012598114B2

(12) United States Patent
Chapalamadugu et al.

(10) Patent No.: US 12,598,114 B2
(45) Date of Patent: Apr. 7, 2026

(54) SYSTEMS AND METHODS FOR OPTIMAL NETWORK SLICE SELECTION

(71) Applicant: Verizon Patent and Licensing Inc., Basking Ridge, NJ (US)

(72) Inventors: Mahesh Chapalamadugu, Plano, TX (US); Raghuram Parvataneni, Frisco, TX (US); Syed Rehman, Monmouth Junction, NJ (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 18/524,492

(22) Filed: Nov. 30, 2023

(65) Prior Publication Data

US 2025/0184237 A1     Jun. 5, 2025

(51) Int. Cl.
| | |
|---|---|
| *G06F 15/16* | (2006.01) |
| *H04L 41/40* | (2022.01) |
| *H04W 24/02* | (2009.01) |

(52) U.S. Cl.
CPC ............. *H04L 41/40* (2022.05); *H04W 24/02* (2013.01)

(58) Field of Classification Search
CPC ............................... H04L 41/40; H04W 24/02
See application file for complete search history.

(56) References Cited

U.S. PATENT DOCUMENTS

| | | | |
|---|---|---|---|
| 11,399,310 B1 * | 7/2022 | Malhotra | ............... H04W 28/06 |
| 2022/0159605 A1 * | 5/2022 | Li | ............................ H04L 67/34 |
| 2023/0132233 A1 * | 4/2023 | Viswambharan | ... H04L 12/1813 |
| | | | 709/224 |
| 2023/0345212 A1 * | 10/2023 | Xu | ......................... H04M 15/44 |

* cited by examiner

*Primary Examiner* — John B Walsh

(57) ABSTRACT

A device may include a processor. The processor may be configured to: receive, from an external device outside a cellular network, a request to provide network slice information for an application which is to receive a service from a network slice when the application is installed and running on a User Equipment device (UE); select optimum network slices for providing the service to the application; and provide the network slice information to the external device, wherein the network slice information identifies the optimum network slices. The external device may be configured to download the application to the UE.

20 Claims, 8 Drawing Sheets

Figure 1:
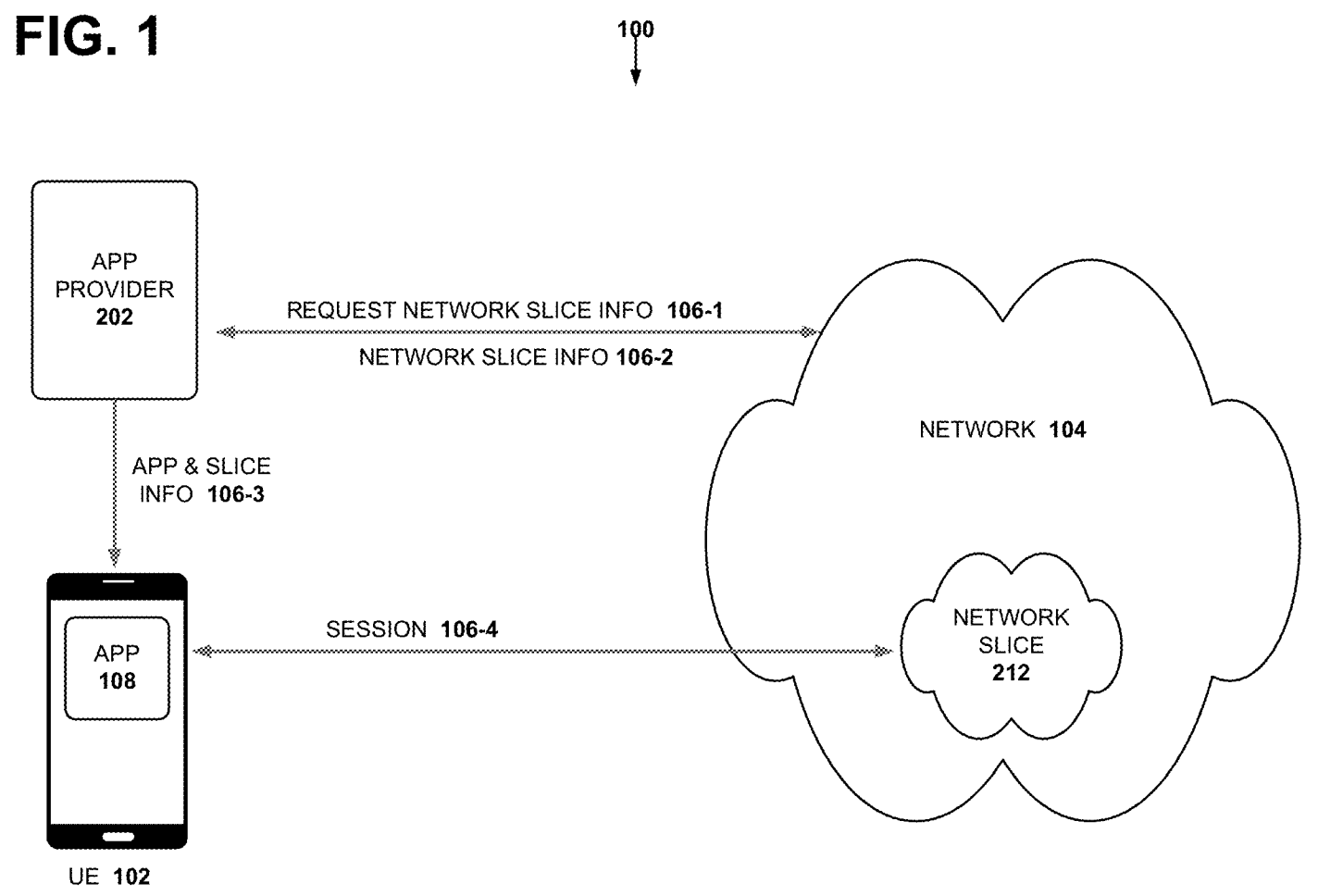

NETWORK 104

NETWORK SLICE 212

REQUEST NETWORK SLICE INFO 106-1

NETWORK SLICE INFO 106-2

SESSION 106-4

APP PROVIDER 202

APP & SLICE INFO 106-3

APP 108

UE 102

APP PROVIDER 202

APP DB
302

UE CAPABILITY DB
304

SIPS INTERFACE
306

SLICE INFO DB
308

| APP ID 312 | UE DATA 314-1 | NETWORK ID 316-1 | SLICE INFO 318-1 |
| | UE DATA 314-2 | NETWORK ID 316-2 | SLICE INFO 318-2 |
| | ● ● ● | ● ● ● | ● ● ● |
| | UE DATA 314-R | NETWORK ID 316-R | SLICE INFO 318-R |

310

CORE NETWORK 206

600

SUBSCRIBE OR REQUEST; RECEIVE CONFIRMATION 602

OBTAIN NS INFO 604

GET A LIST OF SUBSCRIBERS FOR EACH OF THE NSs 606

GET CHARGING INFO 608

GET UTILIZATION INFO 610

GET APP PERFORMANCE DATA; SUBSCRIBE FOR ANALYTICS 612

DETERMINE A LIST OF OPTIMUM NSs; SEND THE LIST 614

PROVIDE UPDATE 616

800

SYSTEMS AND METHODS FOR OPTIMAL NETWORK SLICE SELECTION

BACKGROUND INFORMATION

Fifth Generation (5G) networks implement their core network functions based on a Service Based Architecture (SBA). According to the SBA, each network function fulfills the role of a service producer and/or the role of a service consumer. When a network function assumes the role of a service consumer, the network function may receive a service from a producer; and when a network function assumes the role of a service producer, the network function may provide a service to a consumer.

Network functions are mostly self-contained, independent, and reusable. The modularity of the functions in the SBA permits the network functions to be easily incorporated into network slices within a cellular network. For example, by using the network functions within a cellular network, different network slices can be custom made to provide improved network services to User Equipment devices (UEs) wirelessly connected to the cellular network.

BRIEF DESCRIPTION OF THE DRAWINGS

FIG. 1 illustrates an overview of a system for optimal network slice selection.

DETAILED DESCRIPTION

Figure 2:
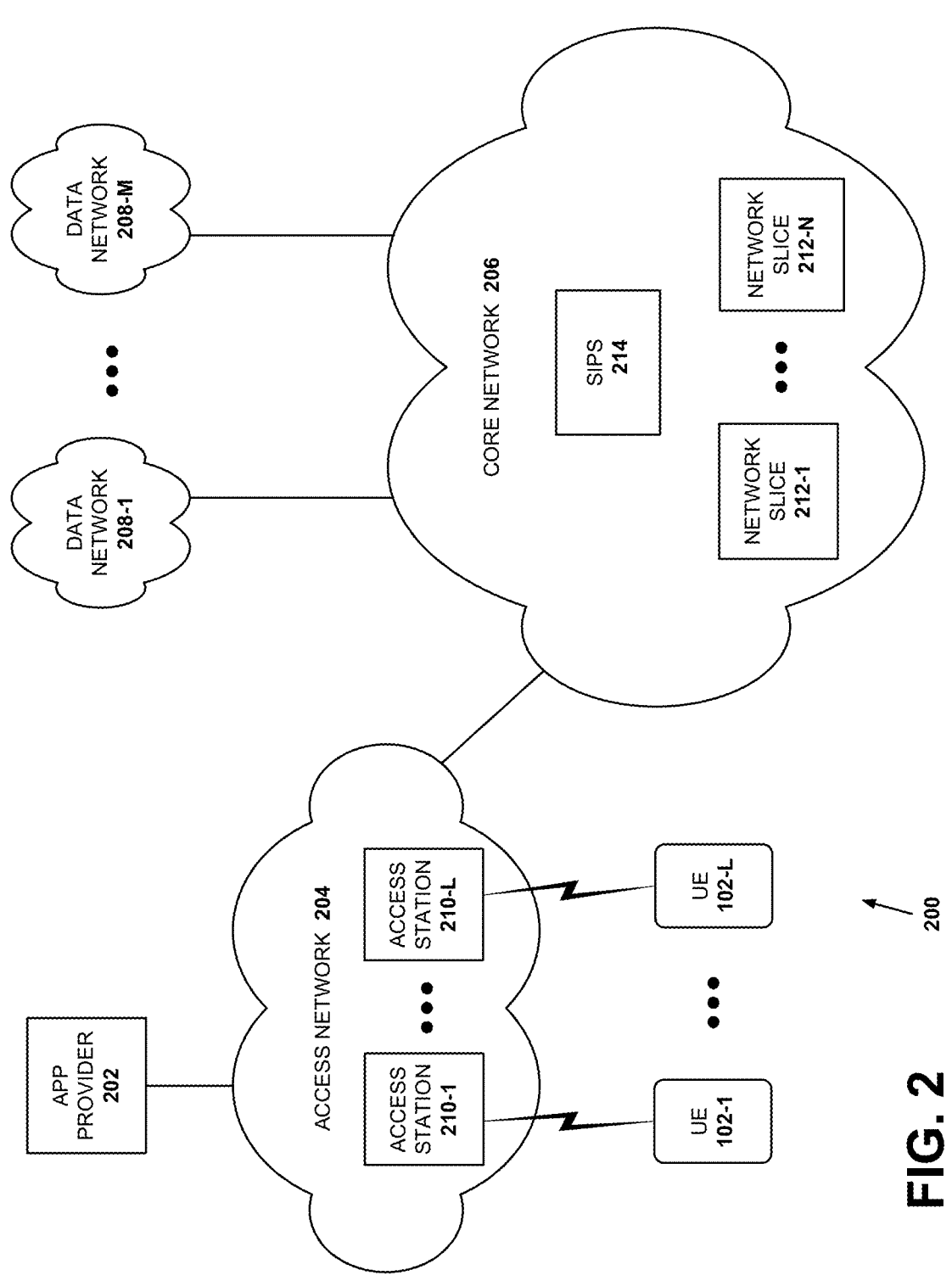
FIG. 2 illustrates an exemplary network environment in which a system described herein may be implemented.

The following detailed description refers to the accompanying drawings. The same reference numbers in different drawings may identify the same or similar elements. As used herein, the terms "service provider" and "provider network" may refer to, respectively, a provider of communication services and a network operated by the service provider. The network may be a cellular network.

As used herein, the term "session" may refer to a series of communications, of a limited duration, between two endpoints (e.g., two applications). When a session is said to be established between an application and a network slice, the session is established between the application and another application/server on the network slice. Similarly, if a session is said to be established between a device and a network slice or a network, the session is established between an application on the device and another application on either the network slice or the network.

Systems and methods described herein relate to optimal network slice selection. One key feature supported by 5G is network slicing. With network slicing, a provider network can provide a user experience that is tailored for the user based on requirements of a specific application.

To optimally select network slices for use by an application, it is necessary to take into consideration multiple factors that influence the performance of network slices and affect the costs of using the network slices. Some of the factors include application requirements (e.g., latency, uplink/downlink throughput, packet loss, jitter, etc.); availability of particular network slices in a particular provider network; resources provisioned for each of the network slices at specific points in time; the number of active subscribers for each network slice; and the capabilities of the User Equipment device (UE) hosting the application that uses the network slices. The systems and methods described herein may identify the optimal network slices for an application to connect to by taking the above-identified factors into consideration.

FIG. 1 illustrates an overview of a system 100 for selecting optimal network slices. As shown, system 100 may include an application (app) provider 202, a UE 102, and portions of a provider network 104. These components are described below in greater detail with reference to other figures. During or after the development of an application, app provider 202 may send a request 106-1 to network 104 for the identifiers (IDs) of optimal network slices. The request may specify the requirements of an application, an application ID (if available), application description, model/make of UEs 102 that may host (e.g., install and use) the application, the capabilities of the make/model of UEs that may host the application, locations/areas (e.g., tracking area code (TAC)), cell IDs, etc. a zip code, etc.), IDs of a particular UE, etc. In response, network 104 may look up the IDs of optimal network slices that are available for use by the application based on the requirements and other information provided in the request. After the selection, network 104 may send a reply 106-2 that includes network slice information, such as IDs of the optimal network slices, costs, latencies, traffic volumes, etc. When app provider 202 receives the reply 106-2, app provider 202 may store the network slice information. App provider 202 may use the information to further develop/modify an application that takes advantage of the network slices 212. In some implementations, app provider 202 may provide the slice information to UEs 102. When application 108 becomes available for use by UEs 102, UE 102 may download application 108 (arrow 106-3). After application 108 installs and launches on UE 102, application 108 may initiate a session with a network slice 212 to receive network services.

FIG. 2 illustrates an exemplary network environment 200 in which system 100 may be implemented. As shown, environment 200 may include UEs 102-1 through 102-L (collectively referred to as UEs 102 and generically referred to as UE 102), an app provider 202, an access network 204, a core network 206, and data networks (DNS) 208-1 through 208-M (collectively referred to as data networks 208 and generically as data network 208). Access network 204, core network 206, and data networks 208 may be part of provider network 104 (shown in FIG. 1 but not in FIG. 2). Each network 104 may have its own unique Public Land Mobile Network (PLMN) ID that may be used to identify network 104 apart from other cellular networks 104.

UEs 102 may include wireless communication devices capable of 5G New Radio (NR) communication. Some UEs 102 may include Fourth Generation (4G) (e.g., Long-Term Evolution (LTE)) communication capabilities or a combination of 5G and 4G communication capabilities (e.g., Evolved-Universal Terrestrial Radio Access-New Radio-Dual connectivity (EN-DC) capability). Examples of UE 102 include: a Fixed Wireless Access (FWA) device; a Customer Premises Equipment (CPE) device; a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IoT) device. In some implementations, UE 102 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Each UE 102 may include one or more of application 108 (not shown in FIG. 2) that receives services from one or more network slices 212. In particular, after UE 102 powers up and registers at network 104, application 108 may request UE 102 to establish a session with network 104. When a communication component (e.g., a modem) in UE 102 receives the request from application 108, the component may use information that application 108 provides to the component via the operating system. The component may use the information to identify the network slice 212 with which application 108 is to establish the session. In some implementations, the information may have been down-loaded from app provider 202 (e.g., when application 108 is downloaded from app provider 202). Next, the component in UE 102 may establish a Protocol Data Unit (PDU) session with the identified network slice 212. Application 108 may then conduct its own session, over the PDU session, with a program (e.g., a server program or another application) running on the network slice 212. Application 108 may receive its services from the program over the session.

App provider 202 may include one or more components for providing applications to UEs 102 and/or to network 104. For example, app provider 202 may include a site for purchasing or licensing application 108, mechanisms for UEs 102 to download application 108, etc. In addition, app provider 202 may include mechanisms for obtaining net-work slice information from a SIPS 214 (to be described below) in network 104 (e.g., a list of optimal network slices 212 for servicing application 108). App provider 202 may use the obtained network slice information in various ways. For example, app provider 202 may use the slice formation to further develop applications 108 that rely on the capabilities of particular network slices 212. In another example, app provider 202 may use the information to generate traffic descriptors for applications 108. UEs 102 may use the traffic descriptors to identify a network slice 212 with which application 108 may establish sessions to receive services.

Access network 204 may allow UE 102 to access core network 206. To do so, access network 204 may establish and maintain, with participation from UE 102, an over-the-air channel with UE 102; and maintain backhaul channels with core network 206. Access network 204 may relay information through such channels, from UEs 102 to core network 206 and vice versa. Access network 204 may include an LTE radio network and/or a 5G NR network, or another advanced radio network. These networks may include many central units (CUs), distributed units (DUs), radio units (RUs), and wireless stations, some of which are illustrated in FIG. 2 as access stations 210 (herein generically referred to as access station 210) for establishing and maintaining over-the-air channel with UEs 102. In some implementations, access station 210 may include a 4G, 5G, 6G or another type of base station (e.g., eNB, gNB, etc.) that includes one or more radio frequency (RF) transceivers. In some implementations, access station 210 may be part of an evolved Universal Mobile Telecommunications Service (UMTS) Terrestrial Radio Access Network (eUTRAN).

Core network 206 may include one or more devices and network components for providing communication services to UEs 102. For example, core network 206 may permit UEs 102 to attach to network 104, establish sessions with devices in network 104, and/or receive services from network 104 (e.g., receive content, access the Internet, conduct video conferences with other UEs 102 attached to network 104). To deliver various services, core network 206 may interface with other networks, such as data networks 208. To render these services and to perform the core functions of network 104, core network 206 may include 5G core network components or 4G (e.g., LTE) core network components. Some of the 5G core network components, herein referred to as network functions (NFs), are described below with reference to FIG. 5.

As further shown, core network 206 may include one or more network slices, shown as network slices 212-1 through 212-N (collectively referred to network slices 212 and generically referred to as network slice 212). Depending on the implementation, network slices 212 may be implemented within other networks, such as access network 204 and/or data networks 208. Access network 204, core network 206, and data networks 208 may include multiple instances of network slices 212. Each network slice 212 may be instantiated as result of network slicing, which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport components, Central Processing Unit (CPU) cycles, memory, etc. Furthermore, each network slice 212 may be configured to meet a different set of requirements and may be associated with a particular QoS Class Identifier (QCI), 5G QOS Identifier (5QI), and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIoT) traffic, Vehicle-to-Everything (V2X) traffic, High performance Machine Type Communication (HMTC) traffic, and other customized traffic, for example. Each network slice 212 may be associated with an identifier, herein referred to as a Single Network Slice Selection Assistance Information (S-NSSAI) and/or a network slice instance ID. Many components in core network may manage S-NSSAIs (or simply NSSAI).

As shown, core network 206 may further include a Slice Information Provider System (SIPS) 214. SIPS 214 may accept requests for slice information from app provider 202 and/or other network components (e.g., UE 102). In response to the request, SIPS 214 may identify optimal network slices for rendering a service to application 108 and provide slice information pertaining to the identified network slices to app provider 202. When identity the optimal network slices 212, SIPS 214 may use information provided in the request and/or data that it collects from other components in network 104. The data that SIPS 214 collects may include, for example, traffic at network slices 212, QoS at network slices 212, availability of network slices 212, bandwidth/throughput at each network slice 212, latency, etc.). Although SIPS 214 is shown in FIG. 2 as part of core network 206, in other embodiments, SIPS 214 may be included in other networks, such as access network 204 or data networks 208. SIPS 214 is described in greater detail below with reference to FIG. 4.

Data networks 208 may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include and/or be connected to a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), a telephone network (e.g., the Public Switched Telephone Network (PSTN) or a cellular network), an intranet, an ad hoc network, or a combination of networks. Data network 208 may include an application server (also referred to as application). An application may render services to an application running on UEs 102 and may establish communication sessions with UEs 102 via core network 206.

For clarity, FIG. 2 does not show all components that may be included in network environment 200 (e.g., routers, bridges, wireless access point, additional networks, additional access stations 210, data centers, portals, etc.). Depending on the implementation, network environment 200 may include additional, fewer, different, or a different arrangement of components than those illustrated in FIG. 2. Furthermore, in different implementations, the configuration of network environment 200 may be different.

Figure 3A:
FIG. 3A depicts example components of an app provider according to an implementation.

FIG. 3A depicts example components of an app provider 202 according to an implementation. As shown, app provider 202 may include app DB 302, a UE capability DB 304, a SIPS interface 306, and/or a slice information DB 308. Depending on the implementation, app provider 202 may include additional, fewer, or different components than those illustrated in FIG. 3A. For example, in one implementation, app provider 202 may include a payment mechanism for UE 102 to purchase and download applications. In another example, app provider 202 may include platforms for a lifecycle management of app development (e.g., a check-in or a check-out system, a testing system, etc.). App provider 202 may use a portal to access other networks, such as network 104.

App DB 302 may store copies of applications and/or app metadata. The app metadata may include various network requirements for servicing the applications. For example, app DB 302 may specify, for an application, an application ID, a description of the application, price for its use (e.g., licensing fees or downloading fees), and/or application type. The application requirements may include thresholds that a network slice 212 or network 104 must meet to effectively service application 108. The application requirements may specify a minimum amount of resources that UE 102 hosting the application 108 or the network slice 212/network 104 servicing the application 108 must have. Examples of requirements include a UE processing requirement (e.g., specified in terms of a processor type or a number of processors), a UE minimum memory, a UE storage requirement, a required make and model of the UE, a bandwidth of the network slice 212 that to service application 108, latency of the network 104 or network slice 212, a bandwidth of the network slice 212, a guaranteed bit rate (GBR) of the network slice 212, a QoS of the network slice 212, etc.

UE capability DB 304 may store capability data that is associated with each type of UE (e.g., a make and a model) that may host one or more of applications 108 whose metadata is stored in app DB 302. UE capability DB 304 may store, for example, for each UE type, its communication capabilities (e.g., 5G capable, 4G capable, etc.), processing power, memory, an operating system, etc.

SIPS interface 306 may include mechanisms for querying SIPS 214 in network 104 and receiving network slice information from SIPS 214. When preparing a query to request SIPS 214 for slice information pertaining to optimal network slices 212 for servicing the application 108, SIPS interface 306 may obtain data related to the application 108 and the service requirements of the application 108 (e.g., the QoS of the network service required by the application 108, the bandwidth/throughput requirements, the latency requirement, etc.) from app DB 302; and obtain data related to types of UEs 102 that may host the application 108 and the UE capabilities from UE capability DB 304. SIPS interface 306 may include the obtained information along with the ID of the application 108 in the query. After forming the query, SIPS interface 306 may forward the query to SIPS 214. SIPS interface 306 may receive network slice information from SIPS 214 in response. SIPS interface 306 may store the received network slice information in slice information DB 308.

Slice information DB 308 may store the network slice information that SIPS interface 306 obtains from SIPS 214, along with an app ID and UE type information. The network slice information may identify optimal network slices 212 in a particular PLMN (e.g., network 104) for servicing applications 108, as well as other information associated with the identified network slices 212.

Figure 3B:
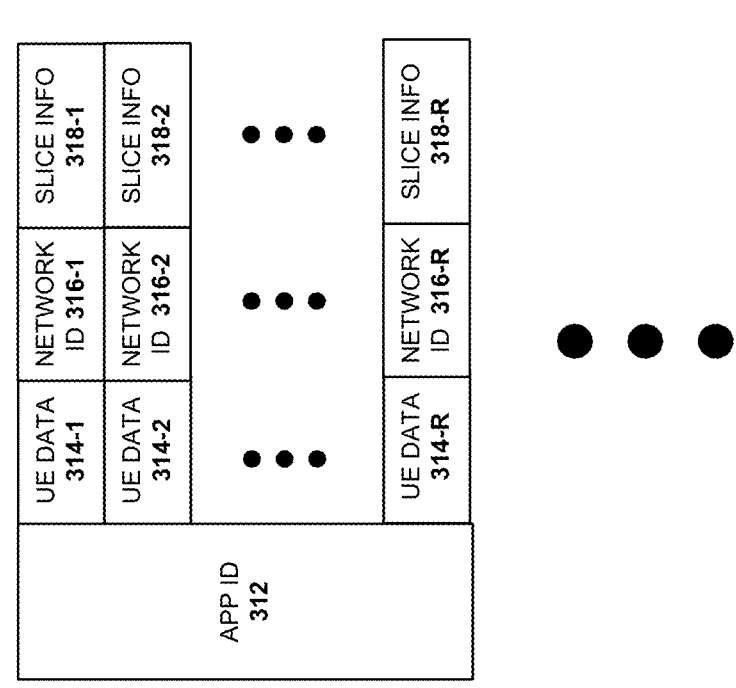
FIG. 3B illustrates example fields of records in slice information database (DB) according to an implementation.

FIG. 3B illustrates example fields of records in slice information DB 308 according to an implementation. As shown, a record 310 may include app ID field 312, a UE data field 314, a network ID field 316, and a slice info field 318. Depending on the implementation, slice information DB 308 may include additional, fewer, or different fields than those illustrated in FIG. 3B. APP ID field 312 may store an ID of the application 108 for which SIPS interface 306 obtained slice information from SIPS 214.

UE data field 314 may store information that identifies or characterizes UEs 102 that may download, install, and/or run the application 108 corresponding to the application ID. UE data field 314 may include some UE capabilities information and/or data that can be used to look up, for a particular UE type (e.g., the processor type, the amount of memory and/or storage, the operating system, 5G/4G capabilities, and/or other information), additional information in UE capability DB 304. Network ID field 316 may store a network ID that may uniquely identify network 104. For example, network ID field 316 may include a PLMN ID that uniquely identifies a cellular network that includes the network slices 212 identified by slice information field 318.

Slice information field 318 may include identifiers for optimal network slices 212, in network 104, for providing services to the application 108 identified by app ID field 312. In addition, slice information field 318 may include other slice information that pertains to the identified network slices 212. The other information may include, for example latencies for each of the slices 212, uplink/downlink throughput for each of the slices 212, packet loss, jitter, availability of each of the slices 212, the number of subscribers for each of the slices 212, a cost associated with using each of the slices 212, the average traffic volume for each of the slices 212, etc.

Figure 4:
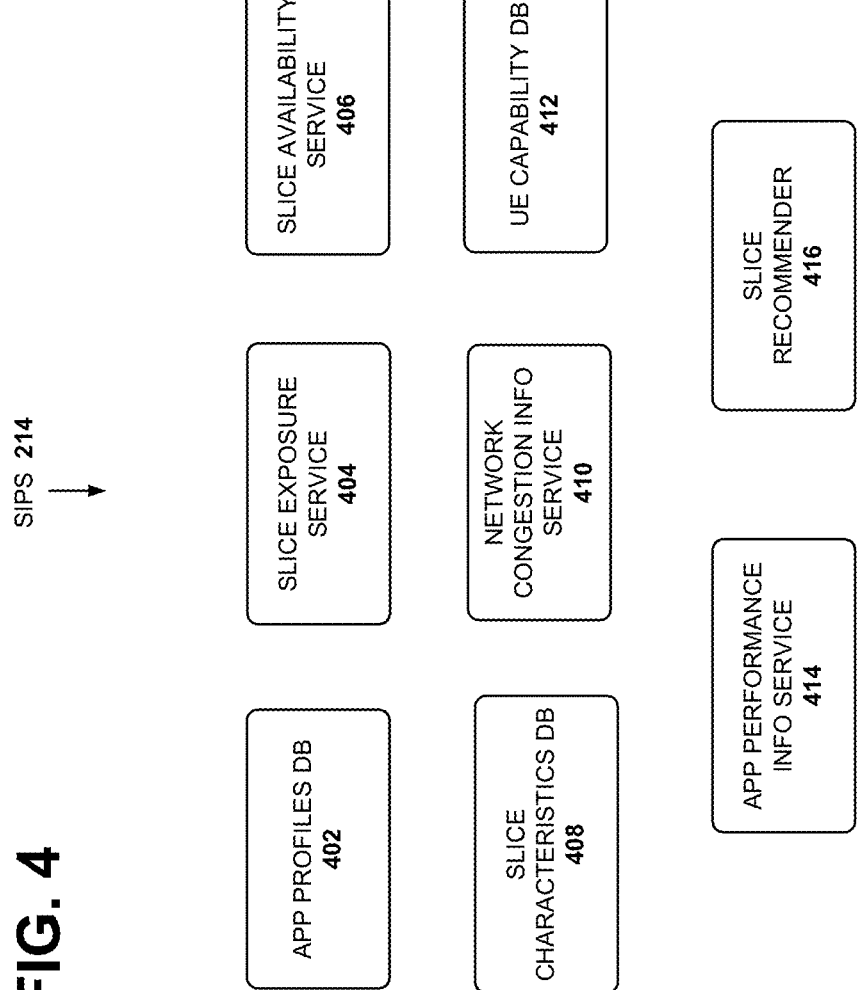
FIG. 4 shows exemplary components of Slice Information Provider System (SIPS) according to an implementation.

FIG. 4 illustrates exemplary components of SIP 214 according to an implementation. As shown, SIPS 214 may include an app profiles DB 402, a slice exposure service 404, a slice availability service 406, a slice characteristics DB 408, a network congestion information service 410, a UE capability DB 412, an app performance info service 414, and a slice recommender 416. Depending on the implementation, SIPS 214 may include additional, fewer, or different components than those illustrated in FIG. 4.

App profiles DB 402 may store information/data about applications 108 at one or more app providers 202. App profiles DB 402 may include a portion of the data app DBs 302 in app providers 202. Such information may include, for example, application IDs of applications 108, such as the requirements for each the applications 108 for receiving network services, descriptions of the applications 108, traffic descriptors for each of the applications 108 identified in app profiles DB 402, etc.

Slice exposure service 404 may receive requests from external network components, for slice information pertaining to optimal network slices 212 for rendering services to applications 108. When accepting requests for slice information, slice exposure service 404 may ensure that the security requirements of network 104 and/or SIPS 214 are met (e.g., perform authentication, apply public key infrastructure (PKI), etc.). When slice exposure service 404 receives a slice information request, slice exposure service 404 may use the information/data provided in the request to identify optimal network slices 212 for servicing the application 108, which is also identified in the request. If the request includes only an app ID and/or a UE type (e.g., the request does not include application requirements or some of the relevant UE capabilities), slice exposure service 404 may use the app ID and/or the UE type to look up the requirements of the application and/or the UEs 102 in app profiles DB 402 and UE capability DB 412. Next, slice exposure service 404 may instruct slice recommender 416 to identify the optimal network slices 212, passing the application requirements and the UE capabilities data to slice recommender 416. When slice recommender 416 returns a list of optimal network slices 212 and slice information associated with the optimal network slices 212, slice exposure service 404 may provide the IDs of the network slices and portions of the slice information to the network component that requested the slice information (e.g., app provider 202).

Slice availability service 406 may receive a request to obtain availability information for network slices 212 from slice recommender 416, and in response, obtain the availability information from other network components (e.g., a Network Slice Selection Function (NSSF) and/or Network Slice Management Function (NSMF)). Slice availability service 406 may provide the availability information to slice recommender 416. The availability information may indicate, for each network slice 212 listed in slice recommender 416's request for slice availability information, whether the network slice 212 is available in particular geographical areas. For example, availability information may indicate that a network slice 212 is unavailable to provide services to UEs 102 in particular cells or areas with tracking area codes (TACs). In another example, availability information may indicate whether the network slices 212 are down and not available to provide services to applications 108.

Slice characteristics DB 408 may store data that characterize network slices 212. When slice recommender 416 is determining which network slices 212 can provide optimal services to an application 108, slice recommender 416 may obtain parameters information, including telemetry information, for network slices 212. The characteristics may include, for example, the number of subscribers for each of the network slices 212, the number of available processors, bandwidths, QoS offered by the network slice 212, locations at which the network slice 212 is available, etc. The telemetry information may include the average traffic volume, latencies, cost (e.g., dollars per megabytes delivered), average number of connections, etc. Some of the telemetry information may be provided by other network components, such as a Network Data Analytics Function (NWDAF).

Network congestion info service 410 may provide slice recommender 416 with network traffic information at particular network slices 212 and at other network components. For example, network congestion information service 410 may obtain network traffic at a network slice 212 and whether the network slice 212 is congested (e.g., a rate of collisions) from performance monitoring components. In some embodiments, network congestion info service 410 may obtain congestion information from core network functions (e.g., Access and Mobility Management Function (AMF)).

UE capability DB 412 may store data that is similar to the data stored at UE capability DB 304—data indicating the capabilities of various UE types. App performance info service 412 may obtain, from various monitoring agents, devices and platforms, data that indicates performance of applications running on network slices 212 and/or data networks 208. The data may include telemetry information, such as traffic, average number connections, bandwidths, latencies, number of packets lost, etc.

Slice recommender 416 may receive instructions to recommend network slices for an application 108 from slice exposure service 404, obtain data to make the recommendation, derive a list of optimal network slices 212 for providing the service to the application 108, and provide the list of optimal network slices 212, along with network slice information to slice exposure service 404.

In addition to recommending optimal network slices 212, slice recommender 416 may collect or receive information related to network slices 212, application servers running on network slices 212 and servicing the applications on UEs 102, and UEs 102 and store them in various databases in SIPS 214. For example, slice recommender 416 may receive data about applications that run on UEs 102 (e.g., application requirements) from app provider 202 and store the data in app profiles DB 402 for use in identifying optimal network slices 214 for serving an application 108. In another example, slice recommender 416 may receive UE capabilities data from different network sources (e.g., a network operator) and store the data in UE capability DB 412; In yet another example, slice recommender 416 may receive and/or collect information about network slices 212 from an NSSF, an NSMF, a Unified Data management (UDM), and/or a charging function (CHF) and store the data in slice characteristics DB 408.

Figure 5:
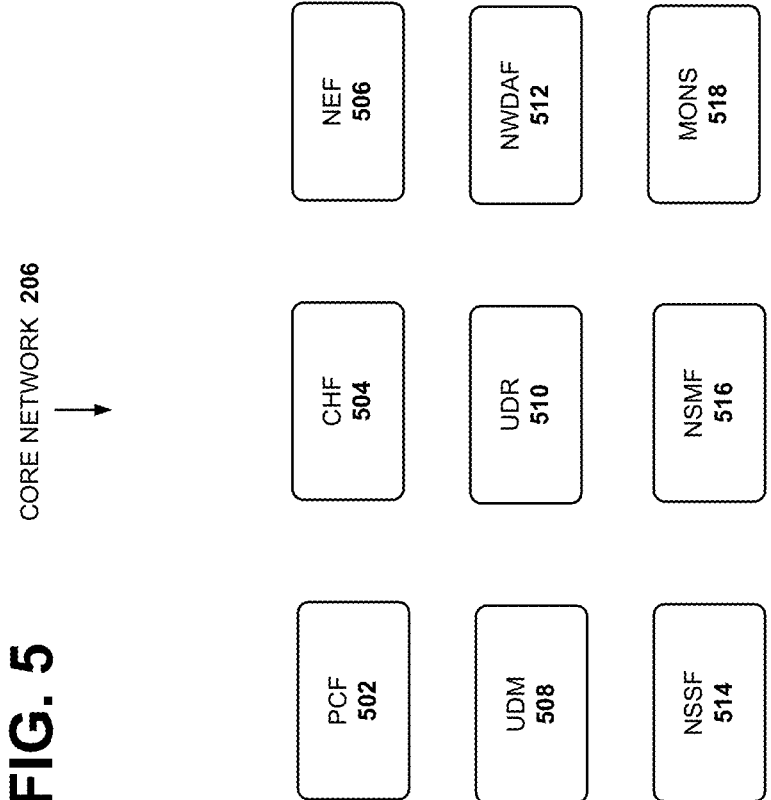
FIG. 5 illustrates example components of a core network, according to an implementation.

FIG. 5 illustrates example components of core network 206, according to an implementation. As shown, core network 206 may include a Policy Control Function (PCF) 502, a Charging Function (CHF) 504, a Network Exposure Function (NEF) 506, a Unified Data Management (UDM) 508, a Unified Data Repository (UDR) 510, a Network Data Analytics Function (NWDAF) 512, a Network Slice Selection Function (NSSF) 514, a Network Slice Management Function (NSMF) 516, and performance monitoring components (MONS) 518. Depending on the implementation, core network 206 may include additional, fewer, or different components than those illustrated in FIG. 5. For example, in a different implementation, core network 206 may also include 4G core network components, such as a Mobility Management Entity, a Serving Gateway (SGW), and a Packet Data Network Gateway (PGW).

PCF 502 may support policies to control network behavior, provide policy rules to control plane functions (e.g., to a Session Management Function (SMF)), access subscription information relevant to policy decisions, perform policy decisions, and/or perform other types of processes associated with policy enforcement. In one implementation, PCF 502 may provide, to slice recommender 416, policies that may affect selections of optimal network slices 212 to service an application 108. Such policies may include policies that affect a QoS for services offered by network slices 212, policies that affect application servers running on network slices 212, policies that limit or increase bandwidths of network slices 212 and/or application servers running on the network slices 212, policies that restrict availability of network slices 212 (e.g., for security reasons). CHF 504 may perform charging and billing functions for core network 206.

In one implementation, CHF 504 may provide charging rates for network slices 212 and/or application servers running on network slices 212.

NEF 506 may expose services, capabilities, and/or events to other network functions (NFs), including third party NFs, Application Functions (AFs), edge computing NFs, and/or other types of NFs. Furthermore, NEF 506 may secure provisioning of information from external applications to core network 206, support a Packet Flow Description (PFD) function, and/or perform other types of network exposure functions. In one implementation, NEF 506 may expose network slice information to app provider 202 or secure information external to network 104 before bringing them into network 104. For example, NEF 506 may act as an intermediary between a portal for app provider 202 and network 104. In some implementations, NEF 506 may maintain usage rates of network slices 212 or data networks 208 and provide the rates to requesting network components, such as SIPS 214.

UDM 508 may maintain subscription information for UEs 102, manage subscriptions, generate authentication credentials, handle user identification, perform access authorization based on subscription data, maintain service and/or session continuity by maintaining assignment of an SMF for ongoing sessions, support Short Message Service (SMS) delivery, support lawful intercept functionality, and/or perform other processes associated with managing user data. UDR 510 may store information that UDM 508 manages. Subscription information that UDM 508 manages (and stored in UDR 510) may comprise UE profiles, including a list of network slices 212 that UE 102 may access (e.g., a list of subscribed network slices 212).

NWDAF 512 may collect analytics information associated with access network 204 and/or core network 204. For example, NWDAF 512 may obtain telemetry information relating to access network 204 from access stations 210 and provide collected telemetry information relating to UEs 110 to other NFs. In another example, NWDAF 512 may obtain analytics information (e.g., predictive analytics data) for network slices 212 and provide them to a requesting network component.

NSSF 514 may select a set of network slice instances to serve a particular UEs 102, determine network slice selection assistance information (NSSAI), determine a particular AMF to serve a particular UE 102, and/or perform other types of processing associated with network slice selection or management. NSSF 514 may provide a list of allowed slices for a particular UE 102 to UDM 508 to store in a subscription profile associated with the particular UE 102.

Network Slice Management Function (NSMF) 516 may manage network slices 212. The management may include instantiation, removal, and/or modification of network slices 212 based on specifications. When an NSMF 516 creates a network slice 212, the NSMF 516 may obtain an S-NSSAI for the network slice 212 and store the S-NSSAI via NSSF 514. In addition, NSMF 516 may store information pertaining to each network slice 212 that it manages, such as resources that are allocated to/for a network slice 212 (e.g., memory, processing power, devices, etc.), slice parameters (e.g., latency, jitter, bandwidth, etc.), geographical locations at which the network slice 212 is available for use, network functions that may be included in the network slice 212, etc.

MONS 518 may include devices for collecting telemetry data from different agents. An agent may include, for example, software network component and/or a hardware component that collects traffic data (e.g., volume), packet delays, jitter, throughput, etc., and forwards the collected data to a repository. MONS 518 may also collect key performance indicators (KPIs). In another example, MONS 518 may collect data from devices that host application servers or from the application servers and store the data in the repository.

Figure 6:
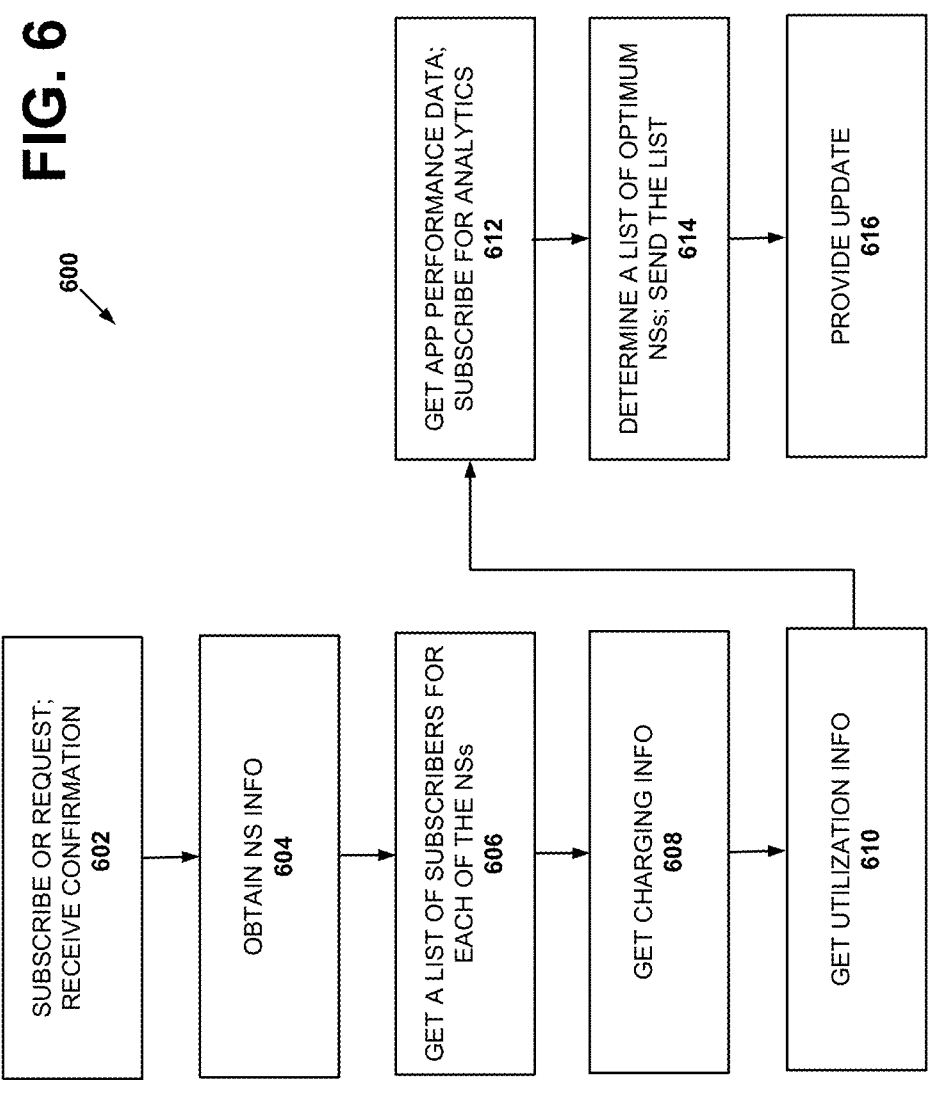
FIG. 6 is a flow diagram of an exemplary process that is associated with a system for optimal network slice selection, according to an implementation.
Figure 7:
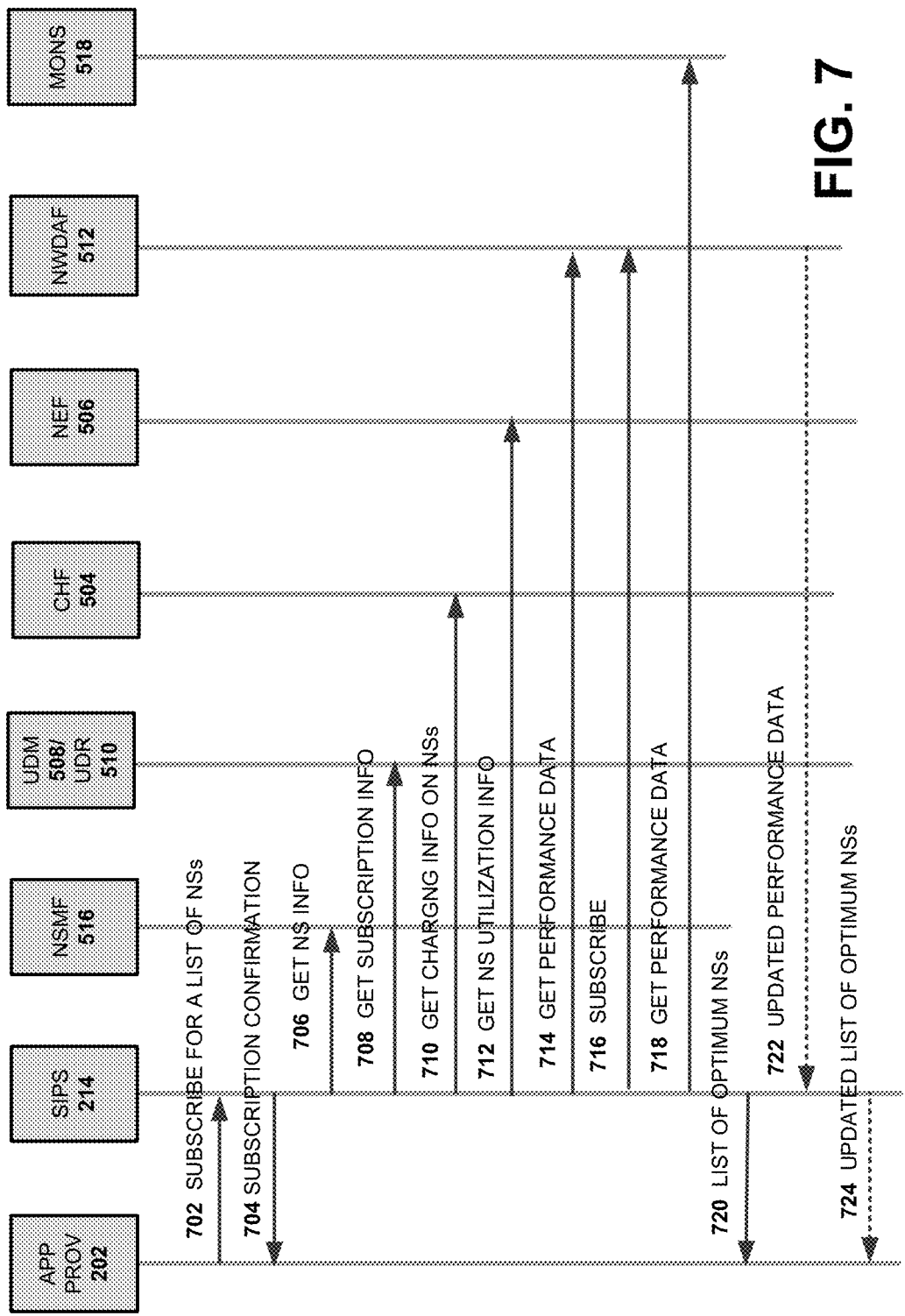
FIG. 7 illustrates example messages that are exchanged by a system for optimal network slice selection, according to an implementation.

FIG. 6 is a flow diagram of an exemplary process 600 that is associated with system 100 for optimal network slice selection, according to an implementation. Process 600 may be performed by one or more components of system 100, such as app provider 202, UE 102, access network 204, and/or core network 206 (e.g., components of SIPS 214 as shown in FIG. 4 or the NFs shown in FIG. 5). FIG. 7 illustrates example messages that are exchanged by system 100 for selecting optimal network slices during process 600, according to an implementation.

As shown in FIG. 6, process 600 may include app provider 202 either requesting SIPS 214 for slice information related to optimal network slices 212 for servicing an application 108 (block 602) or subscribing at SIPS 214 to receive notifications on optimal network slices 212 (arrow 702 in FIG. 7). In response to receiving the request, SIPS 214 may send a confirmation (block 602; arrow 704). Although not shown in FIGS. 6 and 7, in a different implementation, app provider 202 may send the request to SIPS 214 via a portal and/or via NEF 506, which may relay the request to SIPS 214 in a secure manner.

Process 600 may further include SIPS 214 obtaining network slice (NS) information pertaining to network slices 212 in network 104 (block 604). In some implementations, SIPS 214 may obtain the information from NSMF 516 (arrow 706), and in other implementations, SIPS 214 may obtain the information from NSSF 518 (not shown). The information may include network slice IDs (e.g., S-NSSAIs or NSSAI) and/or data that characterize the network slices 212, such as resources allocated to each network slice 212, the QoS that each of the network slice 212 supports, processing power, allocated memory, software installed on each network slice 212, the throughput, the latency, etc.

Process 600 may further include SIPS 214 obtaining a list of subscribers for each of the network slices 212 (block 606). To obtain the list of subscribers for each of the network slices 212, SIPS 214 may query UDM 508/UDR 510 for subscription information that indicates to which network slices 212 a particular UE 102 is subscribed (arrow 708). Upon receipt of the subscription information for different UEs 102, SIPS 214 may determine, for each of the network slices 212, the number of UEs 102 subscribed to the network slice 212.

Process 600 may further include obtaining charging information for each of the network slices 212 (block 608; arrow 710). The charging information may include, for example, the amount charged per bit/byte of communication with the network slice 212; or the amount charged per bit/byte of communication with application servers running on the network slice 212. Depending on the implementation, SIPS 212 may obtain the information from other network components, such as CHF 504.

Process 600 may further include SIPS 214 obtaining utilization information for each of the network slices 212 (block 610; arrow 712). SIPS 214 may obtain the information from NEF 506 and/or AMF (not shown). The utilization information may include the load, traffic, the number of connections, bandwidth used, etc. on each of the network slices 212, Additionally, process 600 may include SIPS 214 getting app performance data from NWDAF 512 and/or subscribing to NWDAF 512 for predictive analytics data (block 612; arrows 714 and 716). As discussed previously, the performance data may include telemetry data as well as throughput, latency, and congestion (e.g., the rate of packet collision) for the application servers running on the network slices 212 and servicing application 108. The predictive analytics data may include predicted performance of the application servers for particular future time intervals for servicing application 108 (e.g., 4-5 PM on Friday evening). When SIPS 214 is subscribed to NWDAF 512 for predictive analytics data, NWDAF 512 may forward predictive analytics data for a specified application server when the predictive analytics data changes (e.g., updated). In some implementations, NWDAF 512 may be unable to collect predictive analytics or performance data for particular application servers. If such data is available via MONS 518, SIPS 214 may obtain the performance data for the specified application servers from MONS 518 (arrow 718).

Process 600 may include determining a list of optimum network slices 212 for the application 108 based on information obtained at blocks 604-612 (block 614) and forwarding the list of optimal network slices 212 and/or network slice information to app provider 202 (block 612; arrow 720). To determine the optimal network slices 212 from the list of network slices 212 from NSSF 514 or NSMF 516, depending on the implementation, SIPS 214 may use various techniques. For example, in one implementation, SIPS 214 may employ decision tree machine learning (e.g., Gradient Boosted Decision trees, Random Forest, AdaBoost, etc.), neural networks, clustering (e.g., K-means clustering), K-nearest neighbor, regression, or another technique. For example, in one implementation, SIPS 214 may assign, for each network slice 212 in the list obtained from either NSSF 514 or NSMF 516, a weighting vector for each different pieces of information obtained at blocks 604-610 (e.g., QoS, throughput, latency, error rate, application performance factors such as its own throughput, traffic, delay, etc.), resources used, slice availability for the UEs 102, the number of subscribed users, cost for using the network slice 212, etc. SIPS 214 may then select the network slices 212 whose sum of the squares of the weighting vectors have the minimum or maximum value. In some implementations, if the weight vector (e.g., the set of weights for the network slice 212) can be correlated with user experience, SIPS 214 may select the network slices 212 whose weight vectors that are associated with the best user experience. After selecting the optimal network slices for the application 108 based on the analysis, SIPS 214 may obtain network slice information for each of the selected network slices 212 (e.g., network slice ID, throughput, latency, availability, cost, QoS, etc.). SIPS 214 may then send the network slice information to app provider 202.

Process 600 may further include SIPS 214 providing updates to app provider 202 (block 616). Providing the updates may include, for example, receiving updated app performance data and/or updated predicted analytics data from NWDAF 512 (arrow 722); and/or MONS 518. After the receipt of the updated data, SIPS 214 may then re-determine the optimal network slices 212 for servicing the application 108, based on the updated data. Next SIPS 214 may send the updated list of optimal network slices 212 and the associated network slice information to app provider 202 (arrow 724). Depending on the embodiment, SIPS 214 may update and send network slice information when other data is updated, such as network slice utilization data or charging information.

Figure 8:
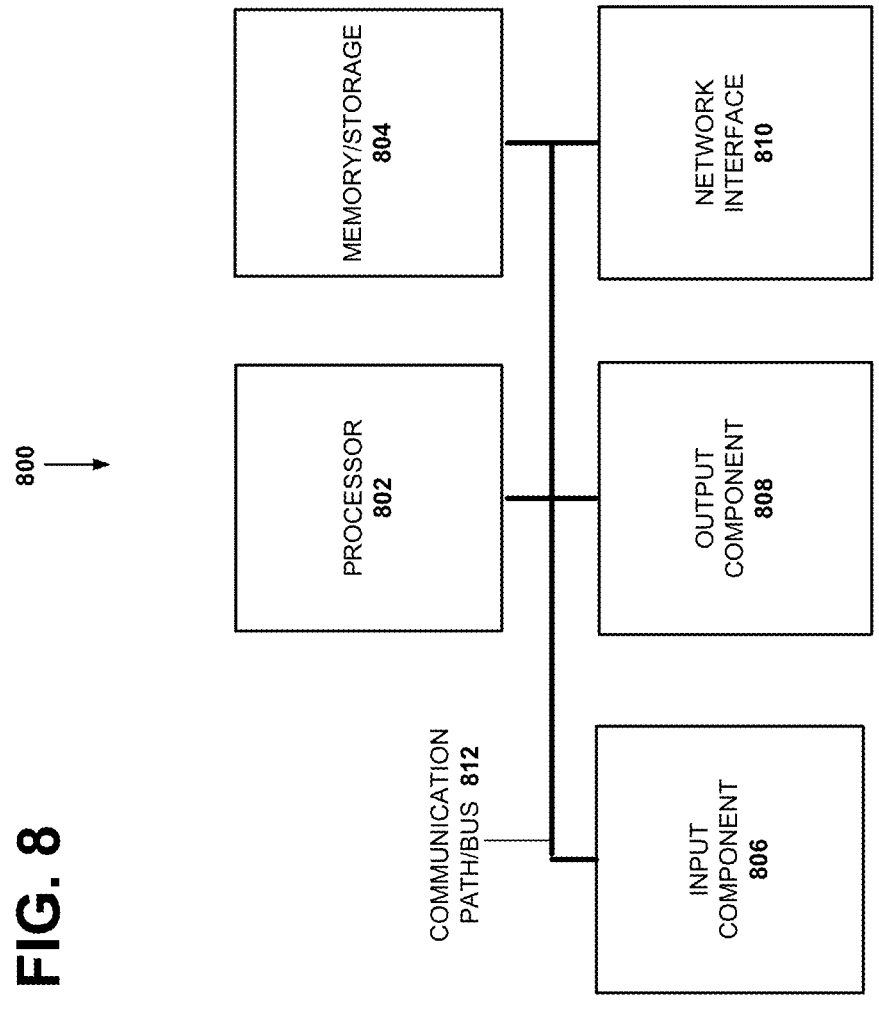
FIG. 8 depicts example functional components of a network device according to an implementation.

FIG. 8 depicts exemplary components of an exemplary network device 800. Network device 800 may correspond to or be included in any of the devices and/or components illustrated in FIGS. 1-5 and 7 (e.g., UE 102, access network 204, core network 206, data network 208, app provider 202, SIPS 214, NFs 502-516, etc.). In some implementations, network devices 800 may be part of a hardware network layer on top of which other network layers and network functions (NFs) may be implemented.

As shown, network device 800 may include a processor 802, memory/storage 804, input component 806, output component 808, network interface 810, and communication path 812. In different implementations, network device 800 may include additional, fewer, different, or different arrangement of components than the ones illustrated in FIG. 8. For example, network device 800 may include line cards, switch fabrics, modems, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 800 and/or executing programs/ instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800.

Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories. Depending on the context, the term "memory," "storage," "storage device," "storage unit," and/ or "medium" may be used interchangeably. For example, a "computer-readable storage device" or "computer-readable medium" may refer to both a memory and/or storage device.

Input component 806 and output component 808 may provide input and output from/to a user to/from network device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to network device 800.

Network interface 810 may include a transceiver (e.g., a transmitter and a receiver) for network device 800 to communicate with other devices and/or systems. For example, via network interface 810, network device 800 may communicate over a network, such as the Internet, an intranet, cellular, a terrestrial wireless network, a satellite-based network, optical network, etc. Network interface 810 may include a modem, an Ethernet interface to a LAN, and/or an interface/connection for connecting network device 800 to other devices.

Communication path or bus 812 may provide an interface through which components of network device 800 can communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory/storage 804, when executed by processor 802, may cause processor 802 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions, messages, and/or signals, have been described with reference to FIGS. 6 and 7, the order of the actions, messages, and signals may be modified in other implementations. In addition, non-dependent actions, messages, and signals may represent actions, messages, and signals that can be performed, sent, and/or received in parallel and in different orders. Furthermore, each of actions, messages, and signals illustrated may include one or more other actions, messages, and/or signals.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code-it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a processor to:
receive, from an external device outside a cellular network, a request to provide network slice information for an application which is to receive a service from a network slice when the application is installed and running on a User Equipment device (UE);
select optimum network slices, within the cellular network, for providing the service to the application; and
provide the network slice information to the external device, wherein the network slice information identifies the optimum network slices, and wherein the external device is configured to:
download the application to the UE,
wherein the cellular network includes the device, and
wherein the external device is different from the UE.

2. The device of claim 1, wherein when selecting the optimum network slices, the processor is to:
determine service requirements of the application based on an application identifier (ID) included in the request.

3. The device of claim 1, wherein when selecting the optimum network slices, the processor is to receive, from components in the cellular network, at least one of:
a list of network slices in the cellular network;
costs associated with using each of the network slices;
availability information for each of the network slices;
utilization information for each of the network slices; or
information that characterizes each of the network slices.

4. The device of claim 3, wherein the availability information includes:
information that specifies, for each of the network slices, geographical areas from which the UE is able to receive the service from the network slice.

5. The device of claim 3, wherein when receiving the costs, the processor is to:
receive the costs from a Charging Function (CHF).

6. The device of claim 3, wherein when receiving the list of network slices in the cellular network, the processor is to:
receive the list from a Network Slice Selection Function (NSSF) or a Network Slice Management Function (NSMF).

7. The device of claim 1, wherein when selecting the optimum network slices, the processor is to:

receive subscription information from a Unified Data Management (UDM); and by using the subscription information, obtain, for each of a plurality of network slices, a list of UEs subscribed to the network slice.

8. A method comprising:

receiving, by a device and from an external device outside a cellular network, a request to provide network slice information for an application which is to receive a service from a network slice when the application is installed and running on a User Equipment device (UE);

selecting optimum network slices, within the cellular network, for providing the service to the application; and providing the network slice information to the external device, wherein the network slice information identifies the optimum network slices, and wherein the external device is configured to:

download the application to the UE, wherein the cellular network includes the device, and wherein the external device is different from the UE.

9. The method of claim 8, wherein selecting the optimum network slices includes:

determining service requirements of the application based on an application identifier (ID) included in the request.

10. The method of claim 8, wherein selecting the optimum network slices includes receiving, from components in the cellular network, at least one of:

a list of network slices in the cellular network;

costs associated with using each of the network slices;

availability information for each of the network slices;

utilization information for each of the network slices; or information that characterizes each of the network slices.

11. The method of claim 10, wherein the availability information includes:

information that specifies, for each of the network slices, geographical areas from which the UE is able to receive the service from the network slice.

12. The method of claim 10, wherein receiving the costs includes:

receiving the costs from a Charging Function (CHF).

13. The method of claim 10, wherein receiving the list of network slices in the cellular network includes:

receiving the list from a Network Slice Selection Function (NSSF) or a Network Slice Management Function (NSMF).

14. The method of claim 8, wherein selecting the optimum network slices includes:

receiving subscription information from a Unified Data Management (UDM); and by using the subscription information, obtaining, for each of a plurality of network slices, a list of UEs subscribed to the network slice.

15. A non-transitory computer-readable medium comprising processor-executable instructions, which when executed by a processor in a device, cause the processor to:

receive, from an external device outside a cellular network, a request to provide network slice information for an application which is to receive a service from a network slice when the application is installed and running on a User Equipment device (UE);

select optimum network slices within the cellular network for providing the service to the application; and provide the network slice information to the external device, wherein the network slice information identifies the optimum network slices, and wherein the external device is configured to:

download the application to the UE, wherein the cellular network includes the device, and wherein the external device is different from the UE.

16. The non-transitory computer-readable medium of claim 15, wherein when selecting the optimum network slices, the processor is configured to:

determine service requirements of the application based on an application identifier (ID) included in the request.

17. The non-transitory computer-readable medium of claim 15, wherein when selecting the optimum network slices, the processor is configured to receive, from components in the cellular network, at least one of:

a list of network slices in the cellular network;

costs associated with using each of the network slices;

availability information for each of the network slices;

utilization information for each of the network slices; or information that characterizes each of the network slices.

18. The non-transitory computer-readable medium of claim 17, wherein the availability information includes:

information that specifies, for each of the network slices, geographical areas from which the UE is able to receive the service from the network slice.

19. The non-transitory computer-readable medium of claim 17, wherein when receiving the costs, the processor is configured to:

receive the costs from a Charging Function (CHF).

20. The non-transitory computer-readable medium of claim 17, wherein when receiving the list of network slices in the cellular network, the processor is configured to:

receive the list from a Network Slice Selection Function (NSSF) or a Network Slice Management Function (NSMF).

* * * * *